US010305386B2

(12) United States Patent
Huang et al.

(10) Patent No.: US 10,305,386 B2
(45) Date of Patent: May 28, 2019

(54) SYSTEMS AND METHODS FOR TWO-LEVEL PROTECTION OF POWER CONVERSION SYSTEMS

(71) Applicant: ON-BRIGHT ELECTRONICS (SHANGHAI) CO., LTD., Shanghai (CN)

(72) Inventors: Xiaomin Huang, Shanghai (CN); Huawei Lv, Shanghai (CN); Chao Yao, Shanghai (CN); Qiang Luo, Shanghai (CN); Lieyi Fang, Shanghai (CN)

(73) Assignee: On-Bright Electronics (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 15/220,223

(22) Filed: Jul. 26, 2016

(65) Prior Publication Data

US 2017/0033699 A1 Feb. 2, 2017

Related U.S. Application Data

(63) Continuation of application No. 13/948,080, filed on Jul. 22, 2013, now Pat. No. 9,431,891.

(30) Foreign Application Priority Data

Jun. 8, 2013 (CN) .......................... 2013 1 0228620

(51) Int. Cl.
*H02M 3/335* (2006.01)
*H02M 1/32* (2007.01)
(Continued)

(52) U.S. Cl.
CPC ......... *H02M 3/33515* (2013.01); *H02M 1/08* (2013.01); *H02M 1/32* (2013.01); *H02M 3/33507* (2013.01); *H02M 2001/0009* (2013.01)

(58) Field of Classification Search
CPC ............... H02M 3/33515; H02M 1/08; H02M 3/33507; H02M 1/32; H02M 2001/0009
(Continued)

(56) References Cited

U.S. PATENT DOCUMENTS

| 7,595,615 B2 | 9/2009 | Li et al. | |
| 7,990,202 B2 * | 8/2011 | Fang | H02M 1/08 327/108 |

(Continued)

FOREIGN PATENT DOCUMENTS

| CN | 101127495 A | 2/2008 |
| CN | 100474752 | 4/2009 |

(Continued)

OTHER PUBLICATIONS

Received STIC search report from EIC 2800 searcher Samir Patel dated Apr. 6, 2017.*

(Continued)

*Primary Examiner* — Emily P Pham
*Assistant Examiner* — Htet Z Kyaw
(74) *Attorney, Agent, or Firm* — Faegre Baker Daniels LLP (57) ABSTRACT

Systems and methods are provided for protecting a power conversion system. A system controller includes a two-level protection component and a driving component. The two-level protection component is configured to detect an output power of a power conversion system and generate a protection signal based on at least information associated with the output power. The driving component is configured to generate a drive signal based on at least information associated with the protection signal and output the drive signal to a switch associated with a primary current flowing through a primary winding of the power conversion system. The driving component is further configured to generate the (Continued)

drive signal corresponding to a first switching frequency to generate the output power equal to a first power threshold and generate the drive signal corresponding to a second switching frequency to generate the output power equal to a second power threshold.

7 Claims, 5 Drawing Sheets

(51) Int. Cl.
*H02M 1/08* (2006.01)
*H02M 1/00* (2006.01)

(58) Field of Classification Search
USPC .......................................................... 363/50
See application file for complete search history.

(56) References Cited

U.S. PATENT DOCUMENTS

| | | | | |
|---|---|---|---|---|
| 8,049,481 B2* | 11/2011 | Li | ..................... | H02M 3/157 |
| | | | | 323/283 |
| 8,385,088 B2 | 2/2013 | Bailey et al. | | |
| 8,879,289 B2* | 11/2014 | Lin | ..................... | H02M 3/33507 |
| | | | | 363/21.18 |
| 9,379,624 B2* | 6/2016 | Lin | ..................... | H02M 3/33523 |
| 9,431,891 B2* | 8/2016 | Huang | ..................... | H02M 1/32 |
| 9,825,542 B2* | 11/2017 | Huang | ..................... | H02M 3/33523 |
| 2010/0164455 A1* | 7/2010 | Li | ..................... | H02M 3/157 |
| | | | | 323/283 |
| 2011/0267853 A1 | 11/2011 | Yang et al. | | |
| 2012/0013321 A1* | 1/2012 | Huang | ..................... | H02M 3/33523 |
| | | | | 323/282 |
| 2013/0003421 A1 | 1/2013 | Fang | | |
| 2017/0133941 A1* | 5/2017 | Huang | ..................... | H02M 3/33523 |

FOREIGN PATENT DOCUMENTS

| | | |
|---|---|---|
| CN | 102570807 A | 7/2012 |
| CN | 102781139 A | 11/2012 |
| CN | 102857097 | 1/2013 |
| CN | 102946197 A | 2/2013 |
| CN | 202840923 | 3/2013 |
| CN | 103066566 | 4/2013 |
| JP | 11-299254 A | 10/1999 |
| TW | 201234754 | 8/2012 |
| TW | 201238224 | 9/2012 |

OTHER PUBLICATIONS

Received STIC search report from EIC 2800 searcher Mesfin Getaneh dated Jun. 29, 2018.*
Chinese Patent Office, Office Action dated Jan. 16, 2017, in Application No. 201510442810.7.
Chinese Patent Office, Office Action dated Feb. 28, 2015, in Application No. 201310228620.6.
Taiwanese Patent Office, Office Action dated Feb. 9, 2015, in Application No. 102127148.

* cited by examiner

SYSTEMS AND METHODS FOR TWO-LEVEL PROTECTION OF POWER CONVERSION SYSTEMS

1. CROSS-REFERENCES TO RELATED APPLICATIONS

This application is a continuation of U.S. patent application Ser. No. 13/948,080, filed Jul. 22, 2013, which claims priority to Chinese Patent Application No. 201310228620.6, filed Jun. 8, 2013, both of these applications being commonly assigned and incorporated by reference herein for all purposes.

2. BACKGROUND OF THE INVENTION

The present invention is directed to integrated circuits. More particularly, the invention provides a system and method for two-level protection. Merely by way of example, the invention has been applied to a power conversion system. But it would be recognized that the invention has a much broader range of applicability.

Generally, a power conversion system includes one or more mechanisms for over-current protection so that the system can be protected against an excessive current if the output load exceeds a limit. For example, if a high output capability is needed for the power conversion system during a short period of time to drive a load (e.g., a printing system, a capacitive load) and/or for over-clocking of a central processing unit, a current threshold for over-current protection may need to be set at a high magnitude in order to provide such high output capability. But when the power conversion system provides the high output capability, the system current may become so high as to cause over-saturation of the system, even though the system current has not yet reached the high current threshold and the over-current protection is not yet triggered. Then, the power conversion system may become over-heated and thus fail.

Hence it is highly desirable to improve the techniques of protecting power conversion systems.

3. BRIEF SUMMARY OF THE INVENTION

The present invention is directed to integrated circuits. More particularly, the invention provides a system and method for two-level protection. Merely by way of example, the invention has been applied to a power conversion system. But it would be recognized that the invention has a much broader range of applicability.

According to one embodiment, a system controller for protecting a power conversion system includes a two-level protection component and a driving component. The two-level protection component is configured to detect an output power of a power conversion system and generate a protection signal based on at least information associated with the output power of the power conversion system. The driving component is configured to generate a drive signal based on at least information associated with the protection signal and output the drive signal to a switch associated with a primary current flowing through a primary winding of the power conversion system. The driving component is further configured to, generate the drive signal corresponding to a first switching frequency to generate the output power equal to a first power threshold, and generate the drive signal corresponding to a second switching frequency to generate the output power equal to a second power threshold, the second power threshold being larger than the first power threshold, the second switching frequency being larger than the first switching frequency. The two-level protection component is further configured to, in response to the output power being equal to or larger than the first power threshold for a first predetermined period of time, generate the protection signal to cause the switch to open and remain open to protect the power conversion system, and in response to the output power being equal to or larger than the second power threshold for a second predetermined period of time, generate the protection signal to cause the switch to open and remain open to protect the power conversion system, the second predetermined period of time being shorter than the first predetermined period of time.

According to another embodiment, a system controller for regulating a power conversion system includes a modulation component and a driving component. The modulation component is configured to receive a feedback signal associated with an output signal of a power conversion system and generate a modulation signal based on at least information associated with the feedback signal, the modulation signal being associated with a modulation frequency. The driving component is configured to generate a drive signal based on at least information associated with the modulation signal and output the drive signal to a switch associated with a primary current flowing through a primary winding of the power conversion system, the drive signal being associated with the modulation frequency. The modulation component is further configured to, increase the modulation frequency from a first frequency magnitude to a second frequency magnitude in response to the feedback signal increasing from a first feedback magnitude to a second feedback magnitude, keep the modulation frequency at the second frequency magnitude if the feedback signal is larger than the second feedback magnitude and smaller than the third feedback magnitude, and increase the modulation frequency from the second frequency magnitude to a third frequency magnitude in response to the feedback signal increasing from the third feedback magnitude to a fourth feedback magnitude.

In one embodiment, a method for protecting a power conversion system includes, detecting an output power of a power conversion system, generating a protection signal based on at least information associated with the output power of the power conversion system, and receiving the protection signal. The method further includes, processing information associated with the protection signal, generating a drive signal based on at least information associated with the protection signal, and outputting the drive signal to a switch associated with a primary current flowing through a primary winding of the power conversion system. The generating a drive signal based on at least information associated with the protection signal includes, generating the drive signal corresponding to a first switching frequency to generate the output power equal to a first power threshold, and generating the drive signal corresponding to a second switching frequency to generate the output power equal to a second power threshold, the second power threshold being larger than the first power threshold, the second switching frequency being larger than the first switching frequency. The generating a protection signal based on at least information associated with the output power of the power conversion system includes, in response to the output power being equal to or larger than the first power threshold for a first predetermined period of time, generating the protection signal to cause the switch to open and remain open to protect the power conversion system, and in response to the output power being equal to or larger than the second power threshold for a second predetermined period of time, generating the protection signal to cause the switch to open and remain open to protect the power conversion system, the second predetermined period of time being shorter than the first predetermined period of time.

In another embodiment, a method for regulating a power conversion system includes, receiving a feedback signal associated with an output signal of a power conversion system, processing information associated with the feedback signal, and generating a modulation signal based on at least information associated with the feedback signal, the modulation signal being associated with a modulation frequency. The method further includes, receiving the modulation signal, processing information associated with the modulation signal, generating a drive signal based on at least information associated with the modulation signal, and outputting the drive signal to a switch associated with a primary current flowing through a primary winding of the power conversion system, the drive signal being related to the modulation frequency. The generating a modulation signal based on at least information associated with the feedback signal includes, increasing the modulation frequency from a first frequency magnitude to a second frequency magnitude in response to the feedback signal increasing from a first feedback magnitude to a second feedback magnitude, keeping the modulation frequency at the second frequency magnitude if the feedback signal is larger than the second feedback magnitude and smaller than the third feedback magnitude, and increasing the modulation frequency from the second frequency magnitude to a third frequency magnitude in response to the feedback signal increasing from the third feedback magnitude to a fourth feedback magnitude.

Depending upon embodiment, one or more benefits may be achieved. These benefits and various additional objects, features and advantages of the present invention can be fully appreciated with reference to the detailed description and accompanying drawings that follow.

5. DETAILED DESCRIPTION OF THE INVENTION

The present invention is directed to integrated circuits. More particularly, the invention provides a system and method for two-level protection. Merely by way of example, the invention has been applied to a power conversion system. But it would be recognized that the invention has a much broader range of applicability.

Figure 1:
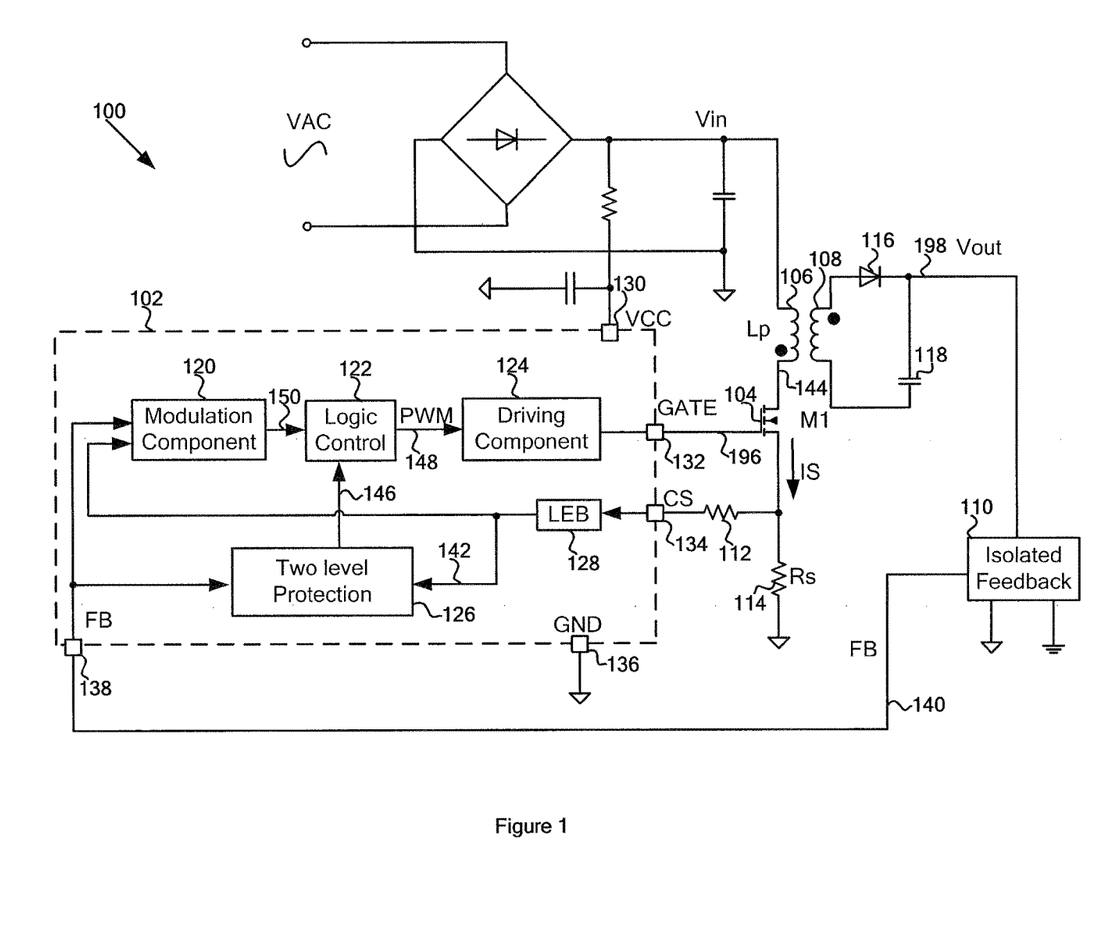
FIG. 1 is a simplified diagram for a power conversion system with two-level protection according to an embodiment of the present invention.

FIG. 1 is a simplified diagram for a power conversion system with two-level protection according to an embodiment of the present invention. This diagram is merely an example, which should not unduly limit the scope of the claims. One of ordinary skill in the art would recognize many variations, alternatives, and modifications. The power conversion system 100 includes a controller 102, a switch 104, a primary winding 106, a secondary winding 108, an isolated feedback component 110, resistors 112 and 114, a diode 116, and a capacitor 118. The controller 102 includes a modulation component 120, a logic controller 122, a driving component 124, a leading-edge-blanking (LEB) component 128, and a two-level protection component 126. In addition, the controller 102 includes terminals 130, 132, 134, 136, and 138. For example, the two-level protection component 126 is a two-level over-power protection component. In another example, the switch 104 is a transistor. In yet another example, the switch 104 is a field effect transistor. In yet another example, the switch 104 is a bipolar transistor. In some embodiments, the LEB component 128 is omitted.

According to one embodiment, the two-level protection component 126 receives a feedback signal 140 associated with an output signal 198 and a current-sensing signal 142 associated with a primary current 144 flowing through the primary winding 106, and outputs a control signal 146 to the logic controller 122. For example, if the output power is below a first-level threshold, the power conversion system 100 performs normal operations. In yet another example, if the output power becomes equal to or larger than the first-level threshold and also remains equal to or larger than the first-level threshold for at least a first predetermined period of time, the two-level protection component 126 changes the signal 146 in order to shut down the power conversion system 100. In yet another example, if the output power becomes equal to or larger than the second-level threshold and also remains equal to or larger than a second predetermined period of time, the two-level protection component 126 changes the signal 146 in order to shut down the power conversion system 100. In yet another example, if the output power increases from the first-level threshold to the second-level threshold, the two-level protection component 126 outputs the signal 146 to the logic controller 122 in order to increase the modulation frequency of the power conversion system 100. For example, if the power conversion system 100 is shut down, the switch 104 is kept open.

In yet another example, after being shut down, the system 100 restarts (e.g., automatically or manually) and starts modulation again. In yet another example, when the system 100 starts modulation again, the switch 104 is closed (e.g., being turned on) and opened (e.g., being turned off) at a modulation frequency.

According to another embodiment, the modulation component 120 receives the feedback signal 140 and outputs a signal 150 to the logic controller 122. For example, the logic controller 122 outputs a signal 148 to the driving component 124 which outputs a drive signal 196 to affect the status of the switch 104. In another example, the feedback signal 140 is generated by the isolated feedback component 110 based on at least information associated with an output signal 198 (e.g., $V_{out}$). In yet another example, the signal 148 and the signal 196 are modulation signals and associated with a modulation frequency.

As discussed above and further emphasized here, FIG. 1 is merely an example, which should not unduly limit the scope of the claims. One of ordinary skill in the art would recognize many variations, alternatives, and modifications. In one embodiment, the two-level protection component 126 does not receive the feedback signal 140. In another embodiment, one or more components are configured to process the feedback signal 140 and generate a processed signal. For example, the processed signal is received by the modulation component 120. In another example, the processed signal is received by the modulation component 120 and the two-level protection component 126.

Figure 2:
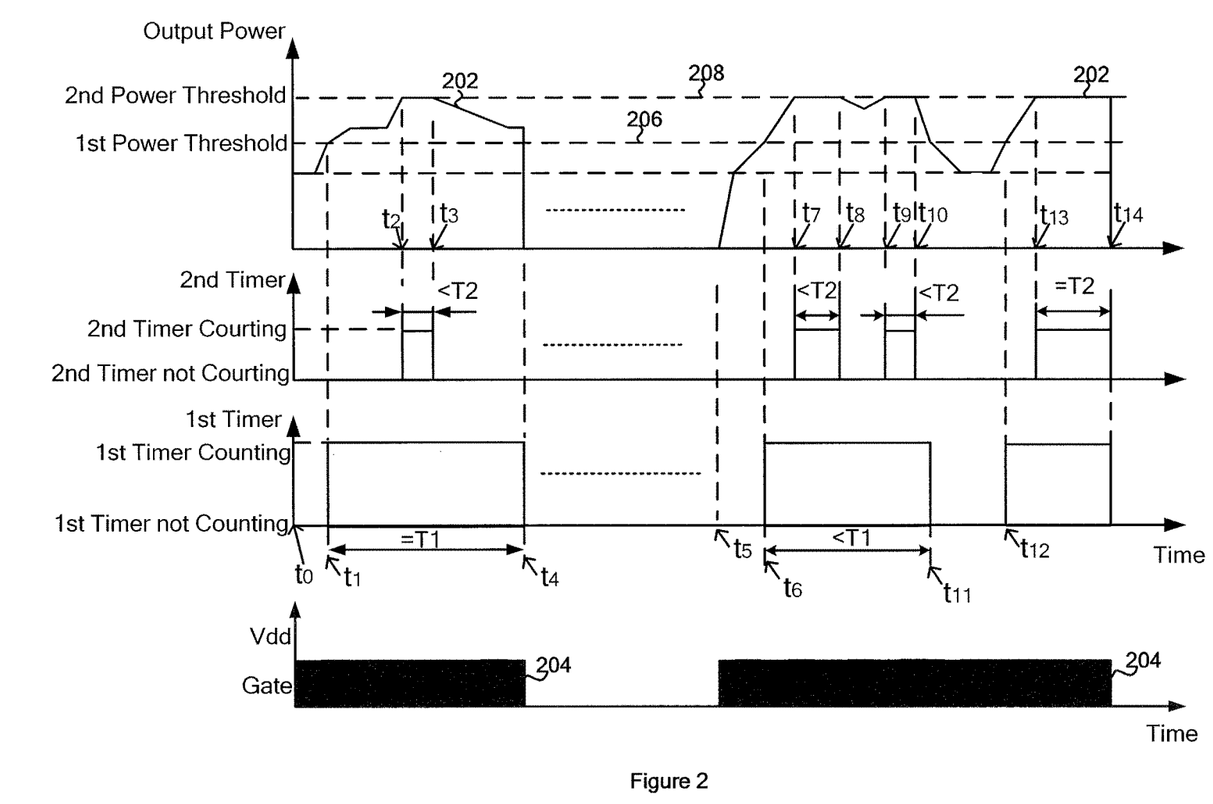
FIG. 2 is a simplified timing diagram for the output power of the power conversion system as shown in FIG. 1 according to an embodiment of the present invention.

FIG. 2 is a simplified timing diagram for the output power of the power conversion system 100 according to an embodiment of the present invention. This diagram is merely an example, which should not unduly limit the scope of the claims. One of ordinary skill in the art would recognize many variations, alternatives, and modifications. The waveform 202 represents the output power of the power conversion system 100 as a function of time, and the waveform 204 represents the drive signal 196 of the power conversion system 100 as a function of time. For example, $t_0 \leq t_1 \leq t_2 \leq t_3 \leq t_4 \leq t_5 \leq t_7 \leq t_8 \leq t_9 \leq t_{10} \leq t_{11} \leq t_{12} \leq t_{13} \leq t_{14}$.

According to one embodiment, during a time period between the time $t_0$ and the time $t_1$, the output power of the power conversion system 100 is below a first power threshold 206 (e.g., as shown by the waveform 202), and a first protection timer associated with the first level protection is not activated. For example, the output power of the power conversion system 100 is below a second power threshold 208, and a second protection timer associated with the second level protection is not activated. In another example, the drive signal 196 changes between a logic high level and a logic low level at a modulation frequency (e.g., as shown by the waveform 204), and in response the switch 104 is closed and opened within a switching period corresponding to the modulation frequency.

According to another embodiment, at the time $t_1$, the output power of the power conversion system 100 becomes equal to or larger than the first power threshold 206 (e.g., as shown by the waveform 202), and the first protection timer is activated to count time. For example, the output power of the power conversion system 100 is below a second power threshold 208, and a second protection timer is not activated.

According to yet another embodiment, during the time period between the time $t_1$ and the time $t_2$, the output power of the power conversion system 100 remains equal to or larger than the first power threshold 206 (e.g., as shown by the waveform 202), and the first protection timer continues to count time. For example, the modulation frequency increases. In another example, at the time $t_2$, the output power of the power conversion system 100 becomes equal to or larger than the second power threshold 208 (e.g., as shown by the waveform 202), and the second protection timer is activated to count time. In yet another example, the second power threshold 208 is larger than the first power threshold 206.

In one embodiment, during the time period between the time $t_2$ and the time $t_3$, the output power of the system 100 remains equal to or larger than the first power threshold 206 (e.g., as shown by the waveform 202), and the first protection timer continues to count time. For example, the output power of the system 100 remains equal to or larger than the second power threshold 208 and the second protection timer continues to count time, during the time period between the time $t_2$ and the time $t_3$. In another example, at the time $t_3$, the output power of the power conversion system 100 becomes smaller than the second power threshold 208 (e.g., as shown by the waveform 202). In yet another example, at the time $t_3$, the second protection timer stops counting, but does not cause the power conversion system 100 to shut down because the time period between the time $t_2$ and the time $t_3$ is smaller than the second predetermined time period (e.g., $T_2$) in duration. In yet another example, at the time $t_3$, the second protection timer is cleared. In yet another example, the second predetermined time period (e.g., $T_2$) is smaller in duration than the first predetermined time period (e.g., $T_1$).

In another embodiment, during the time period between the time $t_3$ and the time $t_4$, the output power of the power conversion system 100 remains equal to or larger than the first power threshold 206 (e.g., as shown by the waveform 202), and the first protection timer continues to count time. For example, from the time $t_1$ to the time $t_4$, the output power of the power conversion system 100 remains equal to or larger than the first power threshold 206, and the time interval between the time $t_1$ to the time $t_4$ is equal to or larger than the first predetermined time period (e.g., $T_1$); in response, the first protection timer causes the power conversion system 100 to shut down at the time $t_4$. In another example, at the time $t_4$, the first protection timer stops counting and is cleared.

After being shut down, the power conversion system 100 restarts at the time $t_5$ (e.g., automatically or manually) and starts modulation again, according to some embodiments. For example, when the system 100 starts modulation, the drive signal 196 begins to change between the logic high level and the logic low level again at a particular modulation frequency (e.g., as shown by the waveform 204), and in response the switch 104 is closed and opened within a switching period corresponding to the particular modulation frequency. In another example, the output power of the system 100 remains smaller than the first power threshold 206 during the time period between $t_5$ and $t_6$, and the first protection timer is not activated. In yet another example, the output power of the system 100 remains smaller than the second power threshold 208 during the time period between $t_5$ and $t_6$, and the second protection timer is not activated.

According to one embodiment, at the time $t_6$, the output power of the power conversion system 100 becomes equal to or larger than the first power threshold 206, and the first protection timer is activated to count time. For example, the output power of the power conversion system 100 is below the second power threshold 208, and the second protection timer is not activated.

According to another embodiment, during the time period between the time $t_6$ and the time $t_7$, the output power of the power conversion system 100 remains equal to or larger than the first power threshold 206 (e.g., as shown by the waveform 202), and the first protection timer continues to count time. For example, the modulation frequency increases. In another example, at the time $t_7$, the output power of the power conversion system 100 becomes equal to or larger than the second power threshold 208 (e.g., as shown by the waveform 202), and the second protection timer is activated to count time.

According to yet another embodiment, during the time period between the time $t_7$ and the time $t_8$, the output power of the system 100 remains equal to or larger than the first power threshold 206 (e.g., as shown by the waveform 202), and the first protection timer continues to count time. For example, the output power of the system 100 remains equal to or larger than the second power threshold 208 and the second protection timer continues to count time, during the time period between the time $t_7$ and the time $t_8$. In another example, at the time $t_8$, the output power of the power conversion system 100 becomes smaller than the second power threshold 208 (e.g., as shown by the waveform 202). In yet another example, at the time $t_8$, the second protection timer stops counting, but does not cause the power conversion system 100 to shut down because the time period between the time $t_7$ and the time $t_8$ is smaller than the second predetermined time period (e.g., $T_2$) in duration. In yet another example, at the time $t_8$, the second protection timer is cleared.

According to yet another embodiment, during the time period between the time $t_8$ and the time $t_9$, the output power of the system 100 remains equal to or larger than the first power threshold 206 (e.g., as shown by the waveform 202), and the first protection timer continues to count time. For example, the output power of the system 100 is smaller than the second power threshold 208, and the second protection timer is not activated to count time. In another example, at the time $t_9$, the output power of the power conversion system 100 becomes equal to or larger than the second power threshold 208 (e.g., as shown by the waveform 202), and the second protection timer is activated again to count time.

In one embodiment, during the time period between the time $t_9$ and the time $t_{10}$, the output power of the system 100 remains equal to or larger than the first power threshold 206 (e.g., as shown by the waveform 202), and the first protection timer continues to count time. For example, the output power of the system 100 remains equal to or larger than the second power threshold 208 and the second protection timer continues to count time, during the time period between the time $t_9$ and the time $t_{10}$. In another example, at the time $t_{10}$, the output power of the power conversion system 100 becomes smaller than the second power threshold 208 (e.g., as shown by the waveform 202). In yet another example, at the time $t_{10}$, the second protection timer stops counting, but does not cause the power conversion system 100 to shut down because the time period between the time $t_9$ and the time $t_{10}$ is smaller than the second predetermined time period (e.g., $T_2$) in duration. In yet another example, at the time $t_{10}$, the second protection timer is cleared.

In another embodiment, during the time period between the time $t_{10}$ and the time $t_{11}$, the output power of the power conversion system 100 remains equal to or larger than the first power threshold 206 (e.g., as shown by the waveform 202), and the first protection timer continues to count time. For example, at the time $t_{11}$, the output power of the power conversion system 100 becomes smaller than the first power threshold 206. In another example, at the time $t_{11}$, the first protection timer stops counting, but does not cause the power conversion system 100 to shut down because the time period between the time $t_6$ and the time $t_{11}$ is smaller than the first predetermined time period (e.g., $T_1$) in duration. In yet another example, at the time $t_{11}$, the first protection timer is cleared.

In yet another embodiment, during the time period between the time $t_{11}$ and the time $t_{12}$, the output power of the power conversion system 100 remains smaller than the first power threshold 206 (e.g., as shown by the waveform 202), and the first protection timer is not activated. For example, the output power of the power conversion system 100 remains smaller than the second power threshold 208 (e.g., as shown by the waveform 202), and the second protection timer is not activated.

According to one embodiment, at the time $t_{12}$, the output power of the power conversion system 100 becomes equal to or larger than the first power threshold 206 (e.g., as shown by the waveform 202), and the first protection timer is activated to count time. For example, the output power of the power conversion system 100 is below a second power threshold 208, and the second protection timer is not activated.

According to another embodiment, during the time period between the time $t_{12}$ and the time $t_{13}$, the output power of the power conversion system 100 remains equal to or larger than the first power threshold 206 (e.g., as shown by the waveform 202), and the first protection timer continues to count time. For example, the modulation frequency increases. In another example, at the time $t_{13}$, the output power of the power conversion system 100 becomes equal to or larger than the second power threshold 208 (e.g., as shown by the waveform 202), and the second protection timer is activated to count time.

According to yet another embodiment, during the time period between the time $t_{13}$ and the time $t_{14}$, the output power of the system 100 remains equal to or larger than the first power threshold 206 (e.g., as shown by the waveform 202), and the first protection timer continues to count time. For example, from the time $t_{13}$ to the time $t_{14}$, the output power of the power conversion system 100 remains equal to or larger than the second power threshold 206, and the time interval between the time $t_{13}$ to the time $t_{14}$ is equal to or larger than the second predetermined time period (e.g., $T_2$); in response, the second protection timer causes the power conversion system 100 to shut down at the time $t_{14}$. In yet another example, at the time $t_{14}$, the second protection timer stops counting and is cleared. In yet another example, at the time $t_{14}$, the first protection timer stops counting and is cleared.

As discussed above and further emphasized here, FIG. 2 is merely an example, which should not unduly limit the scope of the claims. One of ordinary skill in the art would recognize many variations, alternatives, and modifications. In one embodiment, if the output voltage of the power conversion system 100 remains approximately constant, the simplified timing diagram for the output power also approximates a timing diagram for the output current of the power conversion system 100. In another embodiment, the two-level protection component 126 is a two-level over-current protection component. For example, the two-level over-current protection component performs a two-level over-current protection, so that the output current of the power conversion system 100 is subject to two current thresholds and the output voltage 198 of the power conversion system 100 remains approximately constant.

Figure 3A:
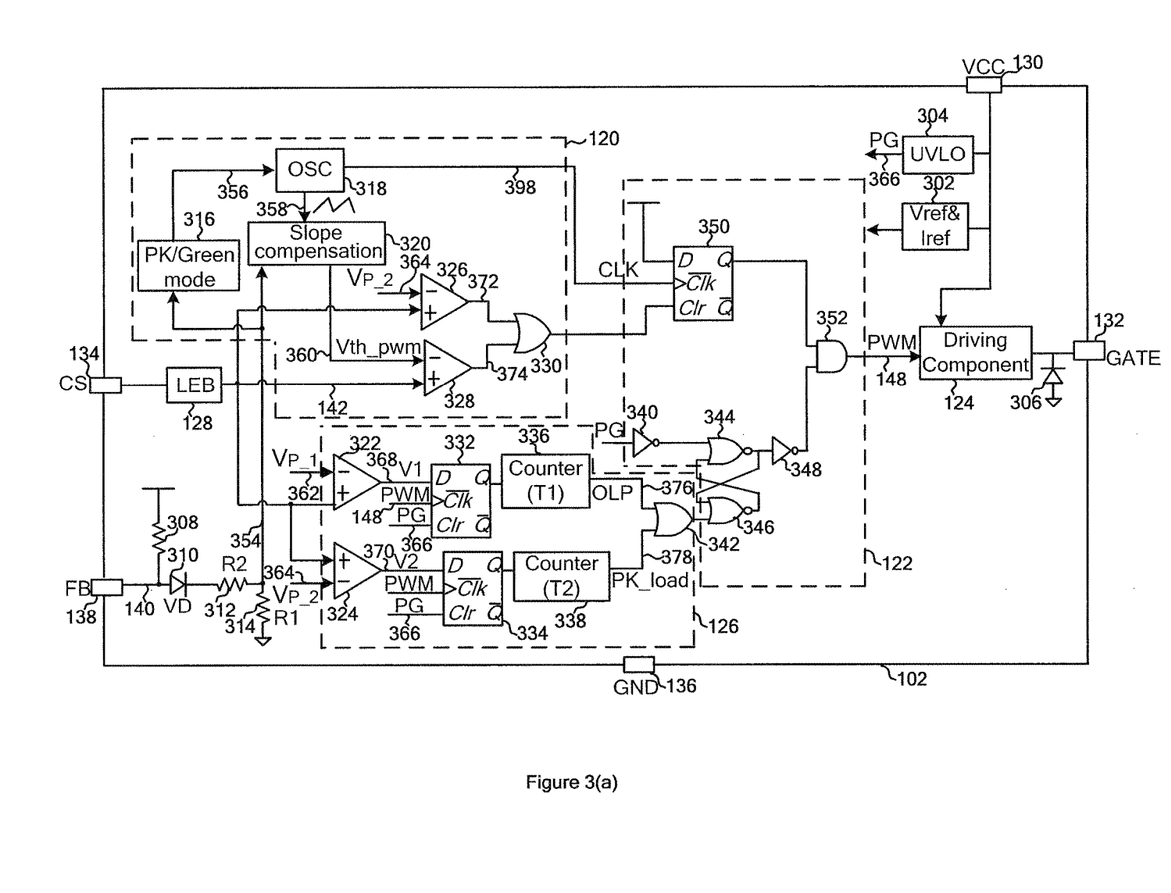
FIG. 3(a) is a simplified diagram for certain components of the controller as part of the power conversion system as shown in FIG. 1 according to an embodiment of the present invention.

FIG. 3(a) is a simplified diagram for certain components of the controller 102 as part of the power conversion system 100 according to an embodiment of the present invention. This diagram is merely an example, which should not unduly limit the scope of the claims. One of ordinary skill in the art would recognize many variations, alternatives, and modifications. The controller 102 further includes an under-voltage lockout component 304, a reference signal generator 302, and a diode 306. The modulation component 120 includes a signal processor 316, an oscillator 318, a slope-compensation component 320, comparators 326 and 328, and an OR gate 330. The logic controller 122 includes a flip-flop component 350, NOT gates 340 and 348, NOR gates 344 and 346, and an AND gate 352. The two-level protection component 126 includes comparators 322 and 324, an OR gate 342, flip-flop components 332 and 334, and counter components 336 and 338. For example, resistors 308, 312 and 314, and a diode 310 are included in the modulation component 120. In another example, the resistors 308, 312 and 314, and the diode 310 are included in the two-level protection component 126. In yet another example, a single comparator serves as both the comparator 324 and the comparator 326.

According to one embodiment, the two-level protection component 126 receives the feedback signal 140 and the current-sensing signal 142 in order to determine when to trigger a first-level protection and a second-level protection. For example, the signal processor 316 receives a signal 354 associated with the feedback signal 140 and outputs a processed signal 356 to the oscillator 318 which outputs a signal 358 to the slope-compensation component 320. In another example, the slope-compensation component 320 also receives the signal 354 and outputs a signal 360 (e.g., $V_{th\_pwm}$) to the comparator 328 which generates a first comparison signal 374. In yet another example, the comparator 322 compares the current-sensing signal 142 with a first threshold signal 362 (e.g., $V_{p\_1}$), and outputs a second comparison signal 368 to the flip-flop component 332 which also receives the signal 148 (e.g., PWM) and a signal 366 (e.g., PG) generated by the component 304. In yet another example, the comparator 324 compares the current-sensing signal 142 with a second threshold signal 364 (e.g., $V_{p\_2}$), and outputs a third comparison signal 370 to the flip-flop component 334 which also receives the signal 148 (e.g., PWM) and the signal 366 (e.g., PG). In yet another example, the comparator 326 compares the current-sensing signal 142 with a second threshold signal 364, and outputs a fourth comparison signal 372 to the OR gate 330. In yet another example, the second threshold signal 364 (e.g., $V_{p\_2}$) is larger than the first threshold signal 362 (e.g., $V_{p\_1}$) in magnitude. In yet another example, the oscillator 318 outputs a signal 398 (e.g., CLK) to the flip-flop component 350. In yet another example, the signal 398 is associated with an oscillation frequency. In yet another example, the oscillation frequency is the same as the modulation frequency associated with the signal 148.

According to another embodiment, if the output load is light, the first-level protection or the second-level protection is not triggered. For example, the signal 360 (e.g., $V_{th\_pwm}$) is determined according to the following equation:

$$V_{th\_pwm} = \frac{FB - V_D}{R_1 + R_2} \times R_1 - \Delta V_{slope} \quad \text{(Equation 1)}$$

where FB represents the feedback signal 140, $V_D$ represents a forward voltage of the diode 310, and $R_1$ represents the resistance of the resistor 314. In addition, $R_2$ represents the resistance of the resistor 312, and $\Delta V_{slope}$ represents a parameter associated with the duty cycle of the signal 148 (e.g., a PWM signal). For example, the signal 354 is determined according to the following equation:

$$FB_{div} = \frac{FB - V_D}{R_1 + R_2} \times R_1 \quad \text{(Equation 2)}$$

where $FB_{div}$ represents the signal 354. In another example, if the current-sensing signal 142 becomes equal to or larger than the signal 360 (e.g., $V_{th\_pwm}$) in magnitude, the comparator 328 outputs the signal 374 to change the signal 148 (e.g., PWM) in order to open (e.g., turn off) the switch 104.

According to yet another embodiment, if the output load increases, the feedback signal 140 increases in magnitude, and the signal 360 (e.g., $V_{th\_pwm}$) increases in magnitude. For example, if the signal 360 (e.g., $V_{th\_pwm}$) is equal to the first threshold signal 362 (e.g., $V_{p\_1}$) in magnitude and the current-sensing signal 142 becomes equal to or larger than the first threshold signal 362 (e.g., $V_{p\_1}$), the comparator 322 outputs the signal 368 (e.g., $V_1$) at a logic high level in order to trigger the counter component 336 to count time. In another example, the flip-flop component 332 samples the signal 368 upon a falling edge of the signal 148. In yet another example, if the signal 368 is kept at the logic high level for a first predetermined time period (e.g., $T_1$), the counter component 336 outputs a signal 376 (e.g., at a logic high level) to trigger the first-level protection. In yet another example, if the first-level protection is triggered, the power conversion system 100 is shut down and the switch 104 keeps open. In yet another example, after being shut down, the system 100 restarts (e.g., automatically or manually) and starts modulation again.

According to yet another embodiment, if the output load continues to increase, the feedback signal 140 continues to increase in magnitude, and the signal 360 (e.g., $V_{th\_pwm}$) increases in magnitude. For example, if the signal 360 (e.g., $V_{th\_pwm}$) becomes equal to or larger than the second threshold signal 364 (e.g., $V_{p\_2}$) in magnitude, the comparator 324 outputs the signal 370 (e.g., $V_2$) at a logic high level in order to trigger the counter component 338 to count time. In another example, the flip-flop component 334 samples the signal 370 upon a falling edge of the signal 148. In yet another example, if the signal 370 is kept at the logic high level for a second predetermined time period (e.g., $T_2$), the counter component 338 outputs a signal 378 (e.g., at a logic high level) to trigger the second-level protection. In yet another example, if the second-level protection is triggered, the power conversion system 100 is shut down and the switch 104 keeps open. In yet another example, after being shut down, the system 100 restarts (e.g., automatically or manually) and starts modulation again. In yet another example, the second predetermined time period (e.g., $T_2$) is smaller in duration than the first predetermined time period (e.g., $T_1$).

As discussed above and further emphasized here, FIG. 3(a) is merely an example, which should not unduly limit the scope of the claims. One of ordinary skill in the art would recognize many variations, alternatives, and modifications. According to certain embodiments, the modulation component 120 may include components not shown in FIG. 3(a). According to some embodiments, one or more components included in the modulation component 120, as shown in FIG. 3(a), may be omitted. According to certain embodiments, the logic controller 122 may include components not shown in FIG. 3(a). According to some embodiments, one or more components included in the logic controller 122, as shown in FIG. 3(a), may be omitted.

Figure 3B:
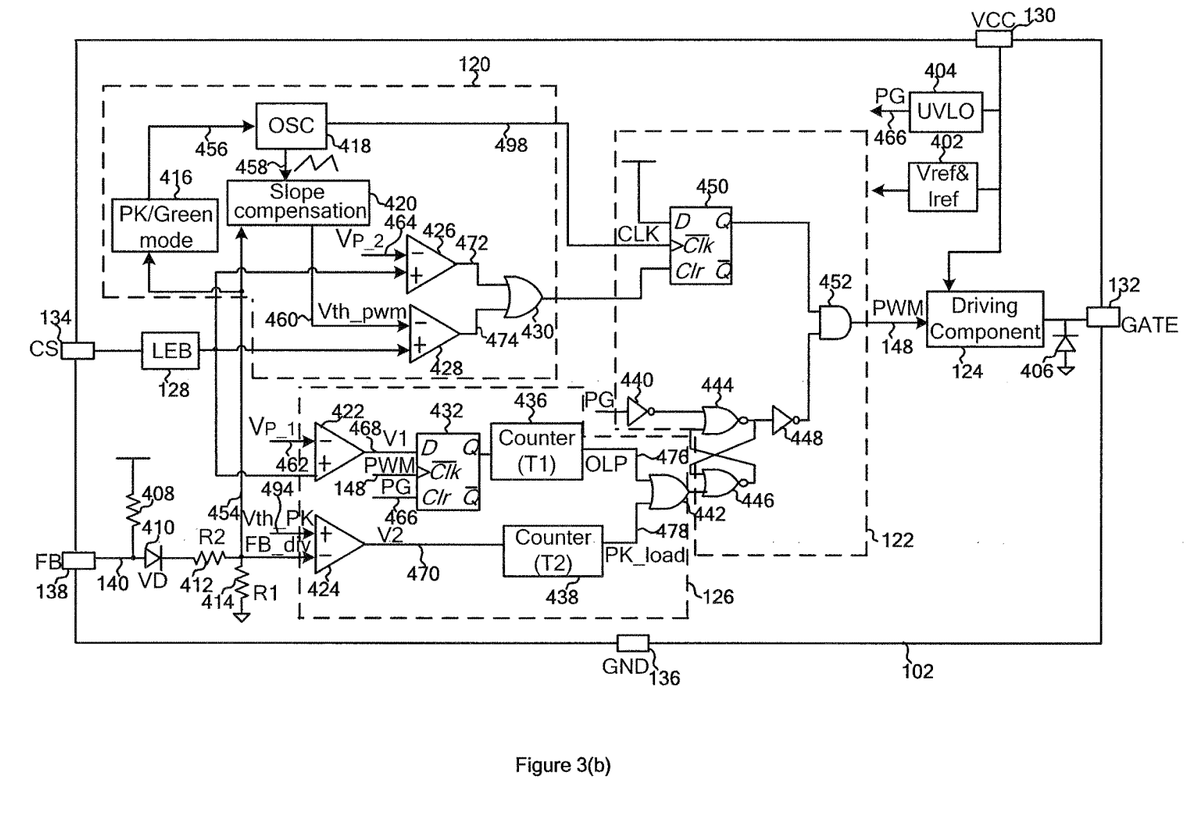
FIG. 3(b) is a simplified diagram for certain components of the controller as part of the power conversion system as shown in FIG. 1 according to another embodiment of the present invention.

FIG. 3(b) is a simplified diagram for certain components of the controller 102 as part of the power conversion system 100 according to another embodiment of the present invention. This diagram is merely an example, which should not unduly limit the scope of the claims. One of ordinary skill in the art would recognize many variations, alternatives, and modifications. The controller 102 further includes an under-voltage lockout component 404, a reference signal generator 402, and a diode 406. The modulation component 120 includes a signal processor 416, an oscillator 418, a slope-compensation component 420, comparators 426 and 428, and an OR gate 430. The logic controller 122 includes a flip-flop component 450, NOT gates 440 and 448, NOR gates 444 and 446, and an AND gate 452. The two-level protection component 126 includes comparators 422 and 424, an OR gate 442, flip-flop components 432 and 434, and counter components 436 and 438. For example, resistors 408, 412 and 414, and a diode 410 are included in the modulation component 120. In another example, the resistors 408, 412 and 414, and the diode 410 are included in the two-level protection component 126.

For example, the under-voltage lockout component 404, the reference signal generator 402, the diodes 406 and 410, the resistors 408, 412 and 414, the signal processor 416, the oscillator 418, the slope-compensation component 420, the comparators 422, 426 and 428, the OR gates 430 and 442, the flip-flop components 432, 434 and 450, the counter components 436 and 438, the NOT gates 440 and 448, the NOR gates 444 and 446, and the AND gate 452 are the same as the under-voltage lockout component 304, the reference signal generator 302, the diodes 306 and 310, the resistors 308, 312 and 314, the signal processor 316, the oscillator 318, the slope-compensation component 320, the comparators 322, 326 and 328, the OR gates 330 and 342, the flip-flop components 332, 334 and 350, the counter components 336 and 338, the NOT gates 340 and 348, the NOR gates 344 and 346, and the AND gate 352, respectively.

According to one embodiment, the two-level protection component 126 receives the feedback signal 140 and the current-sensing signal 142 in order to determine when to trigger protection. For example, the signal processor 416 receives a signal 454 (e.g., FB_div) associated with the feedback signal 140 and outputs a processed signal 456 to the oscillator 418 which outputs a signal 458 to the slope-compensation component 420. In another example, the slope-compensation component 420 also receives the signal 454 (e.g., FB_div) and outputs a signal 460 (e.g., $V_{th\_pwm}$) to the comparator 428 which generates a first comparison signal 474. In yet another example, the comparator 422 compares the current-sensing signal 142 with a first threshold signal 462 (e.g., $V_{p\_1}$), and outputs a second comparison signal 468 to the flip-flop component 432 which also receives the signal 148 (e.g., PWM) and a signal 466 (e.g., PG) generated by the component 404. In yet another example, the comparator 424 compares the signal 454 (e.g., FB_div) with a threshold signal 494 (e.g., $V_{th\_pk}$), and outputs a third comparison signal 470. In yet another example, the comparator 426 compares the current-sensing signal 142 with a second threshold signal 464 (e.g., $V_{p\_2}$), and outputs a fourth comparison signal 472 to the OR gate 430. In yet another example, the signal 494 (e.g., $V_{th\_pk}$) is larger than the first threshold signal 462 (e.g., $V_{p\_1}$) in magnitude. In yet another example, the oscillator 418 outputs a signal 498 (e.g., CLK) to the flip-flop component 450. In yet another example, the signal 498 is associated with an oscillation frequency. In yet another example, the oscillation frequency is the same as the modulation frequency associated with the signal 148.

According to another embodiment, if the output load is light, the first-level protection or the second-level protection is not triggered. For example, the signal 460 (e.g., $V_{th\_pwm}$) is determined according to the following equation:

$$V_{th\_pwm} = \frac{FB - V_D}{R_1 + R_2} \times R_1 - \Delta V_{slope} \qquad \text{(Equation 3)}$$

where FB represents the feedback signal 140, $V_D$ represents a forward voltage of the diode 410, and $R_1$ represents the resistance of the resistor 414. In addition, $R_2$ represents the resistance of the resistor 412, and $\Delta V_{slope}$ represents a parameter associated with the duty cycle of the signal 148 (e.g., a PWM signal). For example, the signal 454 is determined according to the following equation:

$$FB_{div} = \frac{FB - V_D}{R_1 + R_2} \times R_1 \qquad \text{(Equation 4)}$$

where $FB_{div}$ represents the signal 454. In another example, if the current-sensing signal 142 becomes equal to or larger than the signal 460 (e.g., $V_{th\_pwm}$) in magnitude, the comparator 428 outputs the signal 474 to change the signal 148 (e.g., PWM) in order to open (e.g., turn off) the switch 104.

According to yet another embodiment, if the output load increases, the feedback signal 140 increases in magnitude, and the signal 460 (e.g., $V_{th\_pwm}$) increases in magnitude. For example, if the signal 460 (e.g., $V_{th\_pwm}$) is equal to the first threshold signal 462 (e.g., $V_{p\_1}$) in magnitude and the current-sensing signal 142 becomes equal to or larger than the first threshold signal 462 (e.g., $V_{p\_1}$), the comparator 422 outputs the signal 468 (e.g., $V_1$) at a logic high level in order to trigger the counter component 436 to count time. In another example, the flip-flop component 432 samples the signal 468 upon a falling edge of the signal 148. In yet another example, if the signal 468 is kept at the logic high level for a first predetermined time period (e.g., $T_1$), the counter component 436 outputs a signal 476 (e.g., at a logic high level) to trigger the first-level protection. In yet another example, if the first-level protection is triggered, the power conversion system 100 is shut down and the switch 104 keeps open. In yet another example, after being shut down, the system 100 restarts (e.g., automatically or manually) and starts modulation again.

According to yet another embodiment, if the output load continues to increase, the feedback signal 140 continues to increase in magnitude, and the signal 460 (e.g., $V_{th\_pwm}$) increases in magnitude. For example, if the signal 460 (e.g., $V_{th\_pwm}$) becomes equal to or larger than the second threshold signal 464 (e.g., $V_{p\_2}$) in magnitude, the maximum threshold of the current-sensing signal 142 is clamped at the second threshold signal 464 (e.g., $V_{p\_2}$). In another example, if the current-sensing signal 142 becomes equal to or larger than the second threshold signal 464 (e.g., $V_{p\_2}$) in magnitude, the comparator 426 outputs the signal 472 (e.g., at the logic high level) to change the signal 148 in order to open (e.g., turn off) the switch 104. In yet another example, if the signal 454 (e.g., FB_div) becomes equal to or larger than the signal 494 (e.g., $V_{th\_pk}$) in magnitude, the comparator 424 outputs the signal 470 (e.g., $V_2$) at a logic high level in order to trigger the counter component 438 to count time. In yet another example, if the signal 470 is kept at the logic high level for a second predetermined time period (e.g., $T_2$), the counter component 438 outputs a signal 478 (e.g., at a logic high level) to trigger a second-level protection. In yet another example, if the second-level protection is triggered, the power conversion system 100 is shut down and the switch 104 keeps open. In yet another example, after being shut down, the system 100 restarts (e.g., automatically or manually) and starts modulation again. In yet another example, the second predetermined time period (e.g., $T_2$) is smaller in duration than the first predetermined time period (e.g., $T_1$).

As discussed above and further emphasized here, FIG. 3(b) is merely an example, which should not unduly limit the scope of the claims. One of ordinary skill in the art would recognize many variations, alternatives, and modifications. According to certain embodiments, the modulation component 120 may include components not shown in FIG. 3(b). According to some embodiments, one or more components included in the modulation component 120, as shown in FIG. 3(b), may be omitted. According to certain embodiments, the logic controller 122 may include components not shown in FIG. 3(b). According to some embodiments, one or more components included in the logic controller 122, as shown in FIG. 3(b), may be omitted.

Figure 4A:
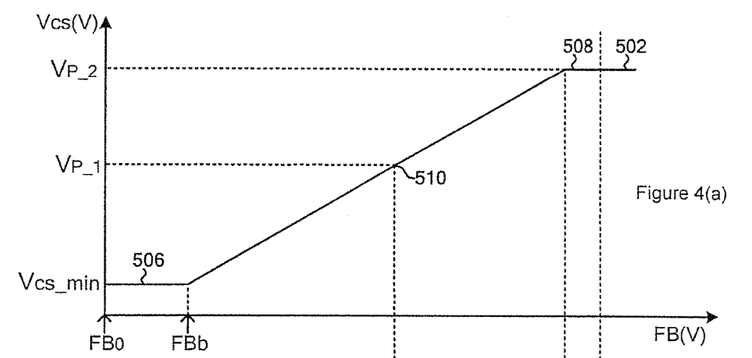
FIGS. 4(a) and 4(b) are simplified diagrams showing the peak value of the current-sensing signal and the modulation frequency of the power conversion system as shown in FIG. 1 as functions of the feedback signal respectively according to certain embodiments of the present invention.
Figure 4B:
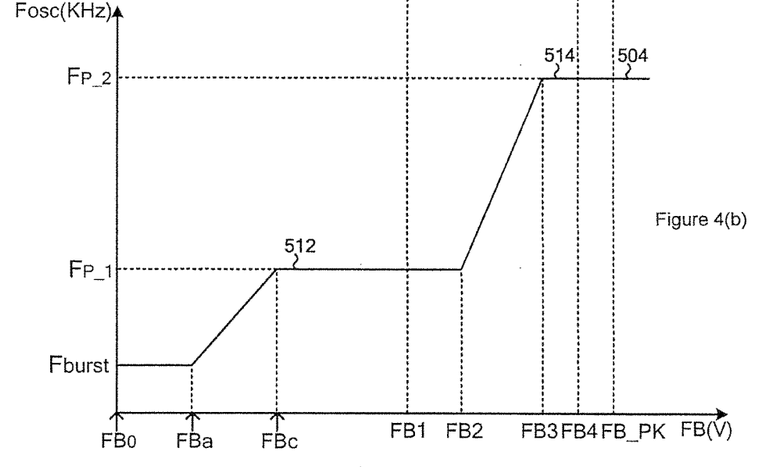

FIGS. 4(a) and 4(b) are simplified diagrams showing the peak value of the current-sensing signal 142 and the modulation frequency of the power conversion system 100 as functions of the feedback signal 140 respectively according to certain embodiments of the present invention. These diagrams are merely examples, which should not unduly limit the scope of the claims. One of ordinary skill in the art would recognize many variations, alternatives, and modifications. The waveform 502 represents the feedback signal 140 as a function of the peak values of the current-sensing signal 142. The waveform 504 represents the feedback signal 140 as a function of the modulation frequency of the power conversion system 100. For example, the modulation frequency of the power conversion system 100 is the same as the modulation frequency associated with the signal 148 and the signal 196.

As shown in FIG. 4(a) and FIG. 4(b), the power conversion system 100 implements two-level protection, in some embodiments. For example, if the feedback signal 140 is in a range between a magnitude FB0 and another magnitude FBb, the peak value of current-sensing signal 142 has a minimum magnitude 506 (e.g., $V_{cs\_min}$), as shown by the waveform 502. In another example, if the feedback signal 140 is in a range between the magnitude FBb and a magnitude FB1, the peak value of the current-sensing signal 142 increases (e.g., linearly or non-linearly) in magnitude with the feedback signal 140 (e.g., from $V_{cs\_min}$ at FBb to $V_{p\_1}$ at FB1), as shown by the waveform 502. In yet another example, if the peak value of the current-sensing signal 142 reaches the first threshold magnitude 510 (e.g., $V_{p\_1}$ at FB1), a first level protection is triggered. In yet another example, if the feedback signal 140 is in a range between the magnitude FB1 and the magnitude FB4, the peak value of the current-sensing signal 142 increases (e.g., linearly or non-linearly) in magnitude with the feedback signal 140 (e.g., from $V_{p\_1}$ at FB1 to $V_{p\_2}$ at FB4), as shown by the waveform 502. In yet another example, if the peak value of the current-sensing signal 142 reaches the maximum magnitude 508 (e.g., $V_{p\_2}$), a second level protection is triggered. In yet another example, the minimum magnitude 506 (e.g., $V_{cs\_min}$) is one fifth of the first threshold magnitude 510 (e.g., $V_{p\_1}$). In yet another example, the minimum magnitude 506 (e.g., $V_{cs\_min}$) is one third of the first threshold magnitude 510 (e.g., $V_{p\_1}$).

In one embodiment, the modulation frequency keeps at a particular magnitude (e.g., $F_{burst}$) which indicates a burst mode, if the feedback signal 140 is within a range between the magnitude FB0 and the magnitude FBa, as shown by the waveform 504. For example, if the feedback signal 140 is in a range between the magnitude FBa and a magnitude FBc, the modulation frequency increases (e.g., linearly or non-linearly) in magnitude with the feedback signal 140 (e.g., from $F_{burst}$ at FBa to $F_{p\_1}$ at FBc), as shown by the waveform 504. In another example, the first threshold value 512 (e.g., $F_{p\_1}$) corresponds to the first level protection. In yet another example, if the feedback signal 140 is in a range between the magnitude FBc and a magnitude FB2, the modulation frequency keeps at the first threshold value $F_{p\_1}$, as shown by the waveform 504. In yet another example, if the feedback signal 140 is equal to the magnitude FB2, the system 100 operates normally under a full-load condition. According to some embodiments, the full-load condition represents a maximum load condition under which the system 100 can deliver the required power to the output load continuously for an extended period of time. For example, the modulation frequency increases (e.g., linearly or non-linearly) from the first threshold value 512 (e.g., $F_{p\_1}$) to a second threshold value 514 (e.g., $F_{p\_2}$) if the feedback signal 140 increases (e.g., linearly or non-linearly) from the magnitude FB2 to the magnitude FB3. In another example, the modulation frequency keeps at the second threshold value 514 (e.g., $F_{p\_2}$), if the feedback signal 140 becomes equal to or larger than the magnitude FB3. In yet another example, the second threshold value (e.g., $F_{p\_2}$) corresponds to the second level protection. In yet another example, if the feedback signal 140 is equal to the magnitude FB3, the output load reaches a peak value. In yet another example, a peak magnitude (e.g., FB_PK) of the feedback signal 140 corresponds to a peak-load condition. According to certain embodiments, the peak-load condition represents a load condition under which a peak power, much larger than that under the full-load condition, can be delivered during only a short period of time (e.g., 10 ms). For example, FB0≤FBa≤FBb≤FBc≤FB1≤FB2≤FB3≤FB_PK.

Referring to FIG. 3(a), the counter 336 associated with the first level protection is triggered to count time if the current-sensing signal 142 becomes equal to or larger than the first threshold signal 362 (e.g., $V_{p\_1}$) in magnitude according to some embodiments. For example, as shown in FIG. 4(a), the first threshold signal 362 (e.g., $V_{p\_1}$) corresponds to the magnitude FB1 of the feedback signal 140. In another example, the counter 336 associated with the first level protection is triggered to count time if the feedback signal 140 is equal to or larger than the magnitude FB1. According to certain embodiments, as shown in FIG. 3(a), the counter 338 associated with the second level protection is triggered to count time if the current-sensing signal 142 becomes equal to or larger than the second threshold signal 364 (e.g., $V_{p\_2}$) in magnitude. For example, as shown in FIG. 4(a), the second threshold signal 364 (e.g., $V_{p\_2}$) corresponds to the magnitude FB4 of the feedback signal 140. In another example, the counter 338 associated with the second level protection is triggered to count time if the feedback signal 140 is equal to or larger than the magnitude FB4.

Referring to FIG. 3(b), the counter 436 associated with the first level protection is triggered to count time if the current-sensing signal 142 becomes equal to or larger than the first threshold signal 462 (e.g., $V_{p\_1}$) in magnitude according to some embodiments. For example, as shown in FIG. 4(a), the first threshold signal 462 (e.g., $V_{p\_1}$) corresponds to the magnitude FB1 of the feedback signal 140. In another example, the counter 436 associated with the first level protection is triggered to count time if the feedback signal 140 is equal to or larger than the magnitude FB1. According to certain embodiments, as shown in FIG. 3(b), the counter 438 associated with the second level protection is triggered to count time if the signal 454 associated with the feedback signal 140 becomes equal to or larger than the threshold signal 494 (e.g., $V_{th\_PK}$) in magnitude. For example, as shown in FIG. 4(b), the threshold signal 494 (e.g., $V_{th\_PK}$) corresponds to the magnitude FB_PK of the feedback signal 140. In another example, the counter 438 associated with the second level protection is triggered to count time if the feedback signal 140 is equal to or larger than the magnitude FB_PK.

Referring back to FIG. 1, the power conversion system 100 operates in a constant-voltage mode, in some embodiments. For example, the output voltage 198 is regulated to be at a desired level based on at least information associated with the feedback signal 140. In another example, if the output voltage 198 deviates from the desired level by a small amount, the feedback signal 140 has a significant change, and thus the controller 102 changes at least the signal 196 in order to adjust the output voltage 198 back to the desired level.

If the output voltage 198 of the power conversion system 100 remains approximately constant, the simplified timing diagram for the output power as shown in FIG. 2 approximates the timing diagram for the output current of the power conversion system 100, according to certain embodiments. For example, a two-level over-current protection may be implemented for the power conversion system 100, where the output current of the power conversion system 100 is subject to two current thresholds. In another example, if the output current is below a first current threshold, the power conversion system 100 performs normal operations. In yet another example, if the output current becomes equal to or larger than a first current threshold and remains equal to or larger than the first current threshold for at least a first predetermined time period, the two-level protection component 126 changes the signal 146 in order to shut down the power conversion system 100. In yet another example, if the output current becomes equal to or larger than a second current threshold (e.g., larger than the first current threshold) and also remains equal to or larger than the second predetermined time period, the two-level protection component 126 changes the signal 146 in order to shut down the power conversion system 100. In yet another example, the second predetermined period of time is smaller than the first predetermined period of time in duration.

According to another embodiment, a system controller for protecting a power conversion system includes a two-level protection component and a driving component. The two-level protection component is configured to detect an output power of a power conversion system and generate a protection signal based on at least information associated with the output power of the power conversion system. The driving component is configured to generate a drive signal based on at least information associated with the protection signal and output the drive signal to a switch associated with a primary current flowing through a primary winding of the power conversion system. The driving component is further configured to, generate the drive signal corresponding to a first switching frequency to generate the output power equal to a first power threshold, and generate the drive signal corresponding to a second switching frequency to generate the output power equal to a second power threshold, the second power threshold being larger than the first power threshold, the second switching frequency being larger than the first switching frequency. The two-level protection component is further configured to, in response to the output power being equal to or larger than the first power threshold for a first predetermined period of time, generate the protection signal to cause the switch to open and remain open to protect the power conversion system, and in response to the output power being equal to or larger than the second power threshold for a second predetermined period of time, generate the protection signal to cause the switch to open and remain open to protect the power conversion system, the second predetermined period of time being shorter than the first predetermined period of time. For example, the system controller is implemented according to FIG. 1, FIG. 2, FIG. 3(a), FIG. 3(b), FIG. 4(a), and/or FIG. 4(b).

According to yet another embodiment, a system controller for regulating a power conversion system includes a modulation component and a driving component. The modulation component is configured to receive a feedback signal associated with an output signal of a power conversion system and generate a modulation signal based on at least information associated with the feedback signal, the modulation signal being associated with a modulation frequency. The driving component is configured to generate a drive signal based on at least information associated with the modulation signal and output the drive signal to a switch associated with a primary current flowing through a primary winding of the power conversion system, the drive signal being associated with the modulation frequency. The modulation component is further configured to, increase the modulation frequency from a first frequency magnitude to a second frequency magnitude in response to the feedback signal increasing from a first feedback magnitude to a second feedback magnitude, keep the modulation frequency at the second frequency magnitude if the feedback signal is larger than the second feedback magnitude and smaller than the third feedback magnitude, and increase the modulation frequency from the second frequency magnitude to a third frequency magnitude in response to the feedback signal increasing from the third feedback magnitude to a fourth feedback magnitude. For example, the system controller is implemented according to FIG. 1, FIG. 2, FIG. 3(a), FIG. 3(b), FIG. 4(a), and/or FIG. 4(b).

In one embodiment, a method for protecting a power conversion system includes, detecting an output power of a power conversion system, generating a protection signal based on at least information associated with the output power of the power conversion system, and receiving the protection signal. The method further includes, processing information associated with the protection signal, generating a drive signal based on at least information associated with the protection signal, and outputting the drive signal to a switch associated with a primary current flowing through a primary winding of the power conversion system. The generating a drive signal based on at least information associated with the protection signal includes, generating the drive signal corresponding to a first switching frequency to generate the output power equal to a first power threshold, and generating the drive signal corresponding to a second switching frequency to generate the output power equal to a second power threshold, the second power threshold being larger than the first power threshold, the second switching frequency being larger than the first switching frequency. The generating a protection signal based on at least information associated with the output power of the power conversion system includes, in response to the output power being equal to or larger than the first power threshold for a first predetermined period of time, generating the protection signal to cause the switch to open and remain open to protect the power conversion system, and in response to the output power being equal to or larger than the second power threshold for a second predetermined period of time, generating the protection signal to cause the switch to open and remain open to protect the power conversion system, the second predetermined period of time being shorter than the first predetermined period of time. For example, the method is implemented according to FIG. 1, FIG. 2, FIG. 3(a), FIG. 3(b), FIG. 4(a), and/or FIG. 4(b).

In another embodiment, a method for regulating a power conversion system includes, receiving a feedback signal associated with an output signal of a power conversion system, processing information associated with the feedback signal, and generating a modulation signal based on at least information associated with the feedback signal, the modulation signal being associated with a modulation frequency. The method further includes, receiving the modulation signal, processing information associated with the modulation signal, generating a drive signal based on at least information associated with the modulation signal, and outputting the drive signal to a switch associated with a primary current flowing through a primary winding of the power conversion system, the drive signal being related to the modulation frequency. The generating a modulation signal based on at least information associated with the feedback signal includes, increasing the modulation frequency from a first frequency magnitude to a second frequency magnitude in response to the feedback signal increasing from a first feedback magnitude to a second feedback magnitude, keeping the modulation frequency at the second frequency magnitude if the feedback signal is larger than the second feedback magnitude and smaller than the third feedback magnitude, and increasing the modulation frequency from the second frequency magnitude to a third frequency magnitude in response to the feedback signal increasing from the third feedback magnitude to a fourth feedback magnitude. For example, the method is implemented according to FIG. 1, FIG. 2, FIG. 3(a), FIG. 3(b), FIG. 4(a), and/or FIG. 4(b).

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention can be combined.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A system controller for regulating a power conversion system, the system controller comprising:
    a modulation component configured to receive a feedback voltage associated with an output voltage of a power conversion system, and generate a modulation signal based on at least information associated with the feedback voltage, the modulation signal being associated with a modulation frequency; and
    a driving component configured to generate a drive signal based on at least information associated with the modulation signal and output the drive signal to a switch associated with a primary current flowing through a primary winding of the power conversion system, the drive signal being associated with the modulation frequency;
    wherein the modulation component is further configured to:
        increase the modulation frequency from a first frequency magnitude to a second frequency magnitude in response to the feedback voltage increasing from a first feedback magnitude to a second feedback magnitude;
        keep the modulation frequency at the second frequency magnitude if the feedback voltage is larger than the second feedback magnitude and smaller than a third feedback magnitude;
        increase the modulation frequency from the second frequency magnitude to a third frequency magnitude in response to the feedback voltage increasing from the third feedback magnitude to a fourth feedback magnitude; and
        in response to determining that a first level protection or a second level protection is triggered, generate a protection signal to cause the switch to open and remain open to protect the power conversion system;
    wherein:
        the second frequency magnitude corresponds to the first level protection; and
        the third frequency magnitude corresponds to the second level protection.

2. The system controller of claim 1, and further comprising a logic controller configured generate a logic-control signal based on at least information associated with the modulation signal and output the logic-control signal to the driving component.

3. The system controller of claim 1 wherein the modulation component is further configured to increase the modulation frequency linearly from the first frequency magnitude to the second frequency magnitude in response to the feedback voltage increasing from the first feedback magnitude to the second feedback magnitude.

4. The system controller of claim 3 wherein the first frequency magnitude corresponds to a burst mode of the power conversion system.

5. The system controller of claim 1 wherein the modulation component is further configured to increase the modulation frequency linearly from the second frequency magnitude to the third frequency magnitude in response to the feedback voltage increasing from the third feedback magnitude to the fourth feedback magnitude.

6. The system controller of claim 5 wherein the third feedback magnitude corresponds to a full-load condition of the power conversion system.

7. A method for regulating a power conversion system, the method comprising:
    receiving a feedback voltage associated with an output signal of a power conversion system;
    processing information associated with the feedback voltage;
    generating a modulation signal based on at least information associated with the feedback voltage, the modulation signal being associated with a modulation frequency;
    receiving the modulation signal;
    processing information associated with the modulation signal;
    generating a drive signal based on at least information associated with the modulation signal; and
    outputting the drive signal to a switch associated with a primary current flowing through a primary winding of the power conversion system, the drive signal being related to the modulation frequency;
    wherein the generating a modulation signal based on at least information associated with the feedback voltage includes:

increasing the modulation frequency from a first frequency magnitude to a second frequency magnitude in response to the feedback voltage increasing from a first feedback magnitude to a second feedback magnitude;

keeping the modulation frequency at the second frequency magnitude if the feedback voltage is larger than the second feedback magnitude and smaller than a third feedback magnitude;

increasing the modulation frequency from the second frequency magnitude to a third frequency magnitude in response to the feedback voltage increasing from the third feedback magnitude to a fourth feedback magnitude; and in response to determining that a first level protection or a second level protection is triggered, generating a protection signal to cause the switch to open and remain open to protect the power conversion system;

wherein:

the second frequency magnitude corresponds to the first level protection; and the third frequency magnitude corresponds to the second level protection.

* * * * *